United States Patent
Abrahami (10) Patent No.: US 10,166,607 B2
(45) Date of Patent: Jan. 1, 2019

(54) TETRAHEDRON-SHAPED CUTTING INSERT, INSERT HOLDER AND CUTTING TOOL

(71) Applicant: Iscar, Ltd., Tefen (IL)

(72) Inventor: Yossi Abrahami, Carmiel (IL)

(73) Assignee: Iscar, Ltd., Tefen (IL)

( * ) Notice: Subject to any disclaimer, the term of this patent is extended or adjusted under 35 U.S.C. 154(b) by 234 days.

(21) Appl. No.: 15/285,560

(22) Filed: Oct. 5, 2016

(65) Prior Publication Data

US 2018/0093332 A1 Apr. 5, 2018

(51) Int. Cl.
| | |
|---|---|
| *B23B 27/22* | (2006.01) |
| *B23B 27/16* | (2006.01) |
| *B23B 27/04* | (2006.01) |
| *B23B 27/08* | (2006.01) |
| *B23B 29/04* | (2006.01) |

(52) U.S. Cl.
CPC .......... *B23B 27/164* (2013.01); *B23B 27/045* (2013.01); *B23B 27/08* (2013.01); *B23B 27/1625* (2013.01); *B23B 29/043* (2013.01); *B23B 2200/04* (2013.01); *B23B 2200/049* (2013.01); *B23B 2205/12* (2013.01); *B23B 2220/12* (2013.01)

(58) Field of Classification Search
CPC ..... B23C 2200/0405; B23C 2200/0411; B23C 2200/0433; B23C 2200/0488; B23C 2200/0444
See application file for complete search history.

(56) References Cited

U.S. PATENT DOCUMENTS

| | | | | |
|---|---|---|---|---|
| 3,178,801 A | * | 4/1965 | Krueger | B23B 27/16 407/113 |
| 3,981,057 A | * | 9/1976 | Koppers | B23B 27/16 407/107 |

(Continued)

FOREIGN PATENT DOCUMENTS

| | | |
|---|---|---|
| EP | 0150901 A2 | 8/1985 |
| WO | WO 2011/159119 | 12/2011 |
| WO | WO 2015/099369 | 7/2015 |

OTHER PUBLICATIONS

International Search Report dated Jan. 12, 2018, issued in PCT counterpart application (No. PCT/IL2017/050991).

(Continued)

*Primary Examiner* — Will Fridie, Jr.
(74) *Attorney, Agent, or Firm* — Womble Bond Dickinson (US) LLP (57) ABSTRACT

A cutting tool includes a two-way indexable cutting insert retained in a tool holder by a clamping member. The cutting insert has a tetrahedral basic shape and includes two cutting edges at opposite ends of thereof. The insert holder includes a forwardly located mounting portion that includes three spaced apart mounting jaws which together define an insert receiving pocket having a pocket opening. The clamping member is attached to the insert holder body so that a clamping portion of the clamping member protrudes into the pocket opening. When the cutting insert is releasably attached to the insert holder in a fastened position of a cutting tool, the cutting insert is located in the insert receiving pocket and clampingly engaged therein by the clamping portion.

40 Claims, 5 Drawing Sheets

(56) References Cited

U.S. PATENT DOCUMENTS

| | | | |
|---|---|---|---|
| 4,693,641 A * | 9/1987 | Tsujimura | B23B 27/1622 |
| | | | 407/113 |
| 4,961,672 A * | 10/1990 | Lindberg | B23B 51/02 |
| | | | 407/104 |
| 5,139,371 A | 8/1992 | Kraft et al. | |
| 5,156,502 A | 10/1992 | Satran | |
| 5,975,812 A | 11/1999 | Friedman | |
| 6,481,938 B2 * | 11/2002 | Widin | B23B 51/02 |
| | | | 408/226 |
| 6,648,560 B2 | 11/2003 | Andras | |
| 6,874,979 B2 * | 4/2005 | Takiguchi | B23B 27/141 |
| | | | 407/113 |
| 8,459,907 B2 | 6/2013 | Mergenthaler | |
| 8,647,028 B2 | 2/2014 | Athad | |
| 2011/0106105 A1 * | 5/2011 | Mergenthaler | B23B 27/16 |
| | | | 606/138 |
| 2012/0201622 A1 * | 8/2012 | Kocherovsky | B23B 29/02 |
| | | | 409/131 |
| 2012/0269588 A1 * | 10/2012 | Kaufmann | B23B 27/04 |
| | | | 407/47 |
| 2013/0279997 A1 | 10/2013 | Hecht | |
| 2017/0368615 A1 * | 12/2017 | Yamamoto | B23C 5/06 |
| 2017/0368617 A1 * | 12/2017 | Choi | B23C 3/305 |
| 2018/0009045 A1 * | 1/2018 | Yamamoto | B23C 5/06 |

OTHER PUBLICATIONS

Written Opinion dated Jan. 12, 2018, issued in PCT counterpart application (No. PCT/IL2017/050991).

* cited by examiner

TETRAHEDRON-SHAPED CUTTING INSERT, INSERT HOLDER AND CUTTING TOOL

FIELD OF THE INVENTION

The subject matter of the present application relates to cutting tools, and in particular to grooving and parting cutting tools, of the type in which a cutting insert, and in particular a tetrahedron-shaped cutting insert, is releasably retained in a mounting jaw of an insert holder by a clamping member.

BACKGROUND OF THE INVENTION

Parting and grooving cutting inserts can be double-ended, with two opposing cutting edges located at the intersection of a top surface and opposing end surfaces of the cutting insert. In order that the non-active cutting edge does not limit the depth of cut during a cutting operation the two opposing cutting edges can be twisted with respect to each other so that said cutting edges are inclined in opposite directions. Examples of such cutting inserts are disclosed in, for example, U.S. Pat. No. 5,156,502, U.S. Pat. No. 5,975,812 and U.S. Pat. No. 8,647,028.

Alternatively, one of the cutting edges can be located at the intersection of a side surface and the end surface of the cutting insert. See, for example, EP 0150 901 A2, WO 2011/159119 and WO 2015/099369.

In addition, cutting inserts having a tetrahedral basic shape are known. Such cutting inserts are disclosed in, for example, U.S. Pat. No. 3,178,801, U.S. Pat. No. 3,981,057, U.S. Pat. No. 6,648,560 B2 and U.S. Pat. No. 8,459,907 B2.

SUMMARY OF THE INVENTION

In accordance with a first aspect of the subject matter of the present application there is provided a two-way indexable cutting insert, comprising:
a regular tetrahedral basic shape defined by exactly four insert corner portions; and
four insert face surfaces mutually intersecting each other and comprising:
    a first rake face surface and a first relief face surface that intersect to form a first major cutting edge; and
    a second rake face surface and a second relief face surface that intersect to form a second major cutting edge, wherein:
each of the four insert surfaces has only one rake face surface or one relief face surface.

In accordance with a second aspect of the subject matter of the present application, there is also provided an insert holder having a holder longitudinal axis defining a forward to rearward direction and comprising:
an insert holder body comprising:
    a holder peripheral surface extending circumferentially along the holder longitudinal axis, the holder peripheral surface intersecting and forming a boundary of, a holder end surface at a forward end of the insert holder body; and
    a forwardly located mounting portion comprising three spaced apart mounting jaws together defining an insert receiving pocket that has a pocket opening located at extremities of the mounting jaws; and
a clamping member attached to the insert holder body, the clamping member comprising a clamping portion protruding into the pocket opening.

In accordance with a third aspect of the subject matter of the present application, there is also provided a cutting tool adjustable between a released position and fastened position, and comprising:
a two-way indexable cutting insert located in the insert receiving pocket and clamped therein by the insert holder's clamping portion, in the fastened position, wherein:
    the cutting insert has a tetrahedral basic shape defined by exactly four insert corner portions and comprises:
    four insert face surfaces mutually intersecting each other and comprising:
        a first rake face surface and a first relief face surface that intersect to form a first major cutting edge; and
        a second rake face surface and a second relief face surface that intersect to form a second major cutting edge.

In accordance with a fourth aspect of the subject matter of the present application, there is also provided a cutting tool adjustable between a released position and fastened position, and comprising:
a cutting insert releasably retained in an insert holder.

It is understood that the above-said is a summary, and that features described hereinafter may be applicable in any combination to the subject matter of the present application, for example, any of the following features may be applicable to the cutting insert, the insert holder or the cutting tool:

The first and second rake face surfaces can be identical to each other. The first and second relief face surfaces can be identical to each other.

The first and second relief face surfaces can be non-identical to the first and second rake face surfaces.

Each insert face surface can have a generally triangular shape defined by three insert corner portions.

The first and second rake face surfaces and first and second relief face surfaces can all mutually intersect each other to form exactly six insert edges, each insert edge extending between two insert corner portions; wherein
    the exactly six insert edges can comprise two spaced apart primary insert edges formed at the intersection of the first rake and relief face surfaces and the second rake and relief face surfaces respectively and four secondary insert edges connecting the two primary insert edges; and
    each major cutting edge can be formed at a respective one of the primary insert edges.

Each major cutting edge can extend along the entire length of the primary insert edge.

The four secondary insert edges can comprise four minor cutting edges. Each minor cutting edge can merge with an associated major cutting edge at a respective insert corner portion.

Each minor cutting edge can be straight.

Each major cutting edge can comprise two convexly curved major cutting edge components and a straight major cutting edge component extending therebetween. Each minor cutting edge can be perpendicular to the straight major cutting edge component of the associated major cutting edge with which it merges.

Each rake face surface can comprise a rake surface adjacent the primary insert edge. Each rake face surface can further comprise a rake clamping surface. The rake clamping surface is spaced apart from the rake surface.

The rake clamping surface can be spaced apart from the rake surface at least by a rake abutment surface.

Each relief face surface can comprise a relief surface adjacent the primary insert edge. Each relief face surface can comprise a relief abutment surface. The relief abutment surface can be spaced apart from the relief surface.

The relief abutment surface can be spaced apart from the relief surface at least by a relief bearing surface.

Each relief face surface can comprise a relief declining surface extending between two adjacent insert face surfaces, the relief declining surface being spaced apart, and decreasing in height in a direction away, from the major cutting edge, the relief declining surface dividing the relief face surface into a relief raised portion and a relief lowered portion. The relief abutment surface can be located on the relief lowered portion. The relief surface can be located on the relief raised portion. The relief bearing surface is located on the relief declining surface.

Each major cutting edge can comprise two convexly curved major cutting edge components formed at two insert corner portions and a straight major cutting edge component extending therebetween.

The straight major cutting edge components on the two major cutting edges are oriented at 90° to each other.

The cutting insert can be devoid of a through-hole.

The clamping member can be elongated. The clamping portion can be located at an extremity of the clamping member.

The insert receiving pocket can be recessed in the holder peripheral surface and open out to the holder end surface.

The mounting portion can comprise exactly three mounting jaws.

The insert holder has a holder main plane that contains the holder longitudinal axis and passes through both the insert receiving pocket and the holder end surface. The mounting jaws can comprise two rearward wedge jaws located either side of the holder main plane and a forward support jaw, located forward of the two rearward wedge jaws, and intersected by the holder main plane.

The mounting portion can comprise a jaw base surface and a jaw rear surface extending transversely thereto, and forming a rearward boundary of the mounting portion. The two rearward wedge jaws can be connected by, and project from, the jaw rear surface. The forward support jaw can project from the jaw base surface.

The mounting portion can comprise two jaw slits, each jaw slit separating the forward support jaw from a respective rearward wedge jaw and opening out to the pocket opening at a forward portion of the mounting portion.

The mounting portion can be mirror symmetrical about the holder main plane.

Each rearward wedge jaw can comprise a wedge abutment surface. The forward support jaw can comprise a primary support abutment surface.

The two wedge abutment surfaces can slope downwardly simultaneously in the forward direction and in an inward direction towards the holder main plan.

The primary support abutment surface can extend longitudinally in a direction perpendicular to the holder longitudinal axis.

The primary support abutment surface can extend longitudinally across the entire width of the insert holder body.

The two wedge abutment surfaces and the primary support abutment surface can be planar.

The insert receiving pocket can be devoid of a pocket threaded hole for retaining a cutting insert.

The clamping member can be separately formed from the insert holder body.

The insert holder body can comprise a holder threaded bore being recessed in, and opening out to, the holder peripheral surface rearward of the insert receiving pocket. The clamping member can comprise a clamping member through hole. The clamping member can be releasably attached to the insert holder body by a retaining screw located in the clamping member through bore and threadingly received in the holder threaded bore.

When the retaining screw is partially threadingly received in the holder threaded bore, the clamping member can be rotatable. about a threaded bore axis of the holder threaded bore so that the clamping portion does not obstruct the pocket opening.

In the fastened position of the cutting tool, the clamping portion can clampingly engage the rake clamping surface of the first rake face surface. The primary support abutment surface can abut the relief bearing surface of the first relief face surface. One of the wedge abutment surfaces can abut the rake abutment surface of the second rake face surface. The other one of the wedge abutment surfaces can abut the relief abutment surface of the second relief face surface.

The forward support jaw can comprise a secondary support abutment surface that is located rearward of, and extends transversely to, the primary support abutment surface. In the fastened position of the cutting tool the secondary support abutment surface can abut a portion of the relief abutment surface of the first relief face surface.

BRIEF DESCRIPTION OF THE FIGURES

For a better understanding of the present application and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
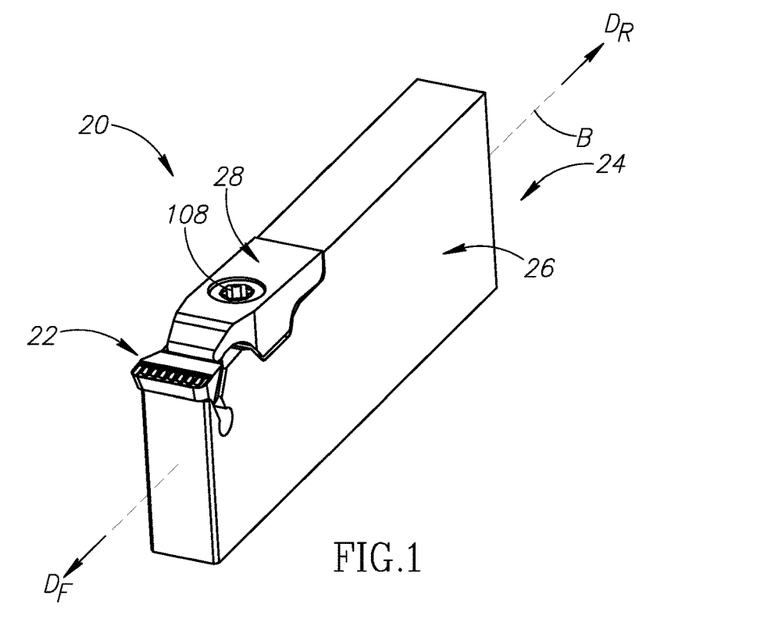
FIG. 1 is a perspective view of a cutting tool.
Figure 2:
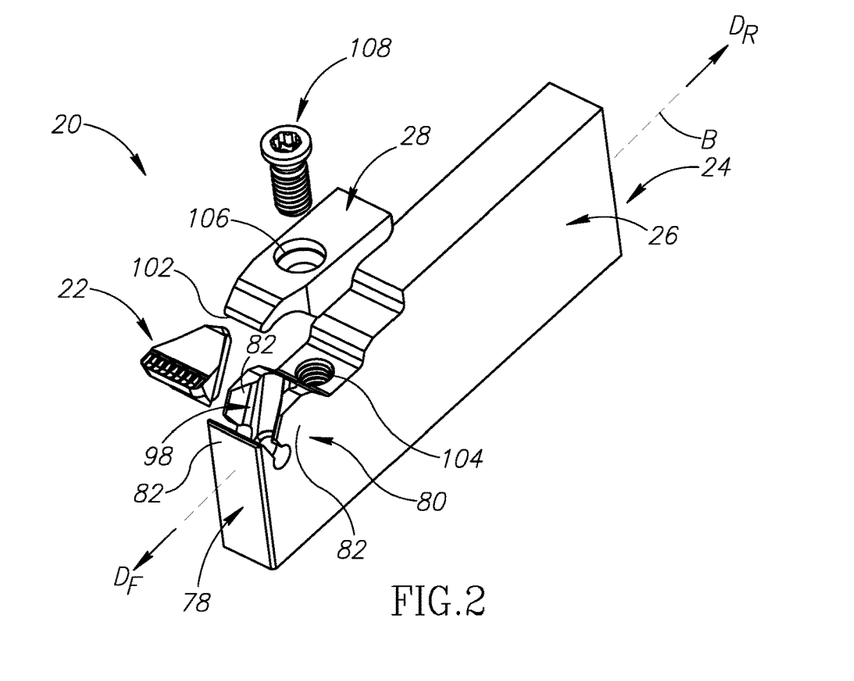
FIG. 2 is an exploded perspective view of the cutting tool shown in FIG. 1.
Figure 3:
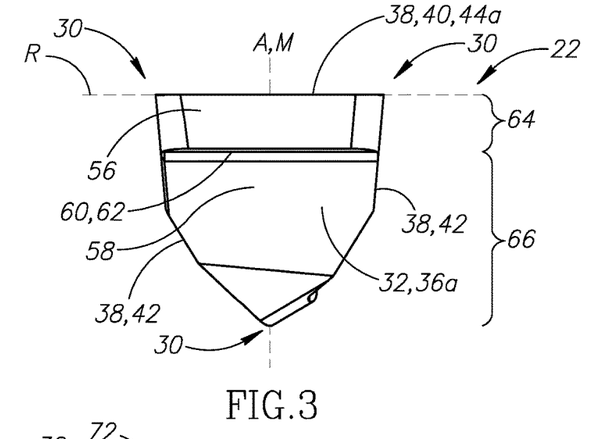
FIG. 3 is a front view of a cutting insert shown in FIG. 1.

Attention is first drawn to FIGS. 1 and 2 showing a cutting tool 20, for chip removal, in accordance with embodiments of the subject matter of the present application. The cutting tool 20 has a cutting insert 22 which can be typically made from cemented carbide. The cutting tool 20 also has an insert holder 24 has an insert holder body 26 which can be typically made from steel. In this non-limiting example the cutting tool 20 is a grooving tool and the cutting insert 22 is a grooving insert. It is noted, however, that the subject matter of the present application also applies to other types of cutting tools, for example, but not limited to, groove-turning tools and profiling tools. The cutting tool 20 is adjustable between a released and fastened position. In the fastened position of the cutting tool 20, the cutting insert 22 is releasably attached to the insert holder body 26, by a clamping member 28.

Reference is now made to FIGS. 3 to 6, showing the cutting insert 22, in accordance with the subject matter of the present application. The cutting insert 22 includes a unitary integral one-piece construction. The cutting insert 22 has a tetrahedral basic shape defined by exactly four insert corner portions 30. The cutting insert 22 includes four insert face surfaces 32. Each insert face surface 32 has a generally triangular shape defined by three insert corner portions 30. Any given insert face surface 32 is connected to three insert corner portions 30 and spaced apart from the remaining insert corner portion 30. The four insert face surfaces 32 include exactly two rake face surfaces 34a, 34b, a first rake face surface 34a and a second rake face surface 34b and exactly two relief face surfaces 36a, 36b, a first relief face surface 36a and a second relief face surface 36b.

The two rake face surfaces 34a, 34b and the exactly two relief face surfaces 36a, 36b all mutually intersect each other to form exactly six insert edges 38. It should be appreciated that the expression "insert edge" as applied to the intersection of the two rake face surfaces 34a, 34b and the two relief face surfaces 36a, 36b, does not necessarily mean a distinct, cornered edge, with respect to non-cutting edges. For example, some portions of said intersection can be convexly curved. Each insert edge 38 extends between two insert corner portions 30. The exactly six insert edges 38 include two spaced apart primary insert edges 40 formed at the intersection of the first rake and relief face surfaces 34a, 36a and the second rake and relief face surfaces 34b, 36b respectively. The two primary insert edges 40 extend between mutually different insert corner portions 30. The exactly six insert edges 38 further include four secondary insert edges 42 that connect the two primary insert edges 40. Each insert face surface 32 is bounded by one of the primary insert edges 40 and two of the secondary insert edges 42.

In accordance with some embodiments of the subject matter of the present application, the first and second rake face surfaces 34a, 34b can be identical to each other and the first and second relief face surfaces 36a, 36b can be identical to each other. The first and second rake face surfaces 34a, 34b can be non-identical to the first and second relief face surfaces 36a, 36b.

Figure 4:
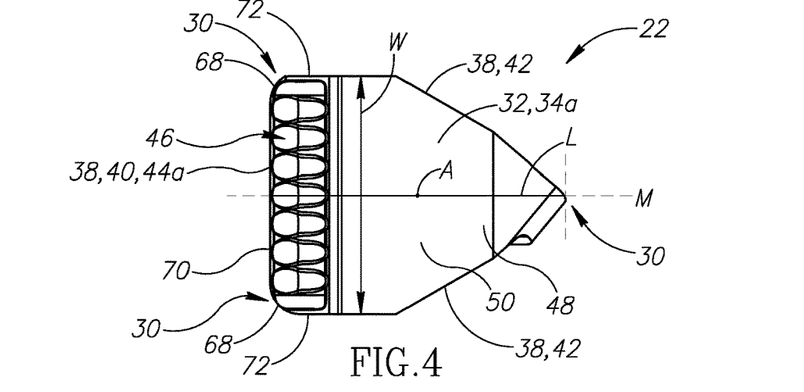
FIG. 4 is a top view of the cutting insert shown in FIG. 3.
Figure 5:
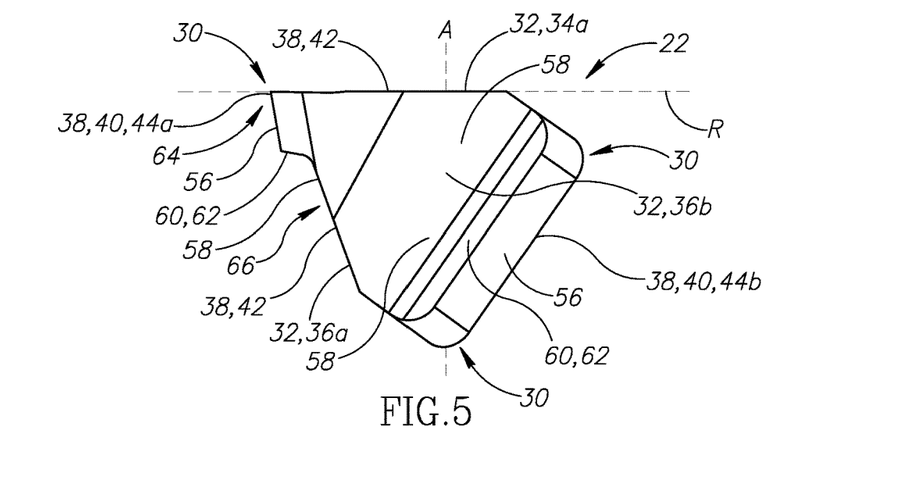
FIG. 5 is a first side view of the cutting insert shown in FIG. 3.

The cutting insert 22 has a first insert axis A that passes through a central portion of the first rake face surface 34a. The first insert axis A is contained in an insert median plane M that can divide one of the primary insert edges 40 equally and is perpendicular to a rake plane R defined by the first rake face surface 34a. In accordance with some embodiments of the subject matter of the present application, the cutting insert 22 can be rotationally-asymmetric about the first insert axis A. The cutting insert 22 can be mirror-asymmetric about the insert median plane M. The cutting insert 22 can be devoid of a through-hole for receiving a fastening screw. As shown in FIG. 4, in a top view of the cutting insert 22, that is, in a view taken in a direction along the first insert axis A in front of the first rake face surface 34a, the cutting insert 22 has a maximum cutting insert width W, measured in a direction along the primary insert edge 40. That is, measured in a direction perpendicular to the insert median plane M. In the same view, the cutting insert 22 has a maximum cutting insert length L measured in a direction perpendicular to the cutting insert width W. The first insert axis A can be located halfway along the maximum cutting insert length L from one of the primary insert edges 40. In accordance with some embodiments of the subject matter of the present application, the maximum cutting insert length L can be in the range $W \leq L \leq W*1.5$. Corresponding features can also be included with regard to the second rake face surface 34b. In particular, in an analogous view in front of the second rake face surface 34b, an equivalent range can apply to a second maximum length of the cutting insert 22 (in relation to a second maximum width), in which case the cutting insert 22 is said to have a regular tetrahedral basic shape. Advantageously, in such a configuration the two rake face surfaces 34a, 34b are of sufficient length to accommodate a rake surface and clamping surface (as described hereinafter) while less material is used to manufacture the cutting insert 22 compared to standard grooving inserts that have the same cutting width known in the art, which have a generally rectangular prismatic shape as disclosed in, for example, U.S. Pat. No. 8,647,028. Also, such cutting inserts 22 are more rigid, and less likely to bend or flex.

Each rake face surface 34a, 34b includes a rake surface 46 adjacent the primary insert edge 40. The purpose and geometry of the rake surfaces 46 are known in the art and are not part of the present invention. In accordance with some embodiments of the subject matter of the present application, each rake face surface 34a, 34b can include a rake clamping surface 48, for being clampingly engaged by the clamping member 28. The rake clamping surface 48 can be spaced apart from the rake surface 46. Each rake face surface 34a, 34b can include a rake abutment surface 50, for abutting a corresponding surface on insert holder 24. The rake clamping surface 48 can be spaced apart from the rake surface 46 at least by the rake abutment surface 50.

Each relief face surface 36a, 36b includes a relief surface 56 adjacent the primary insert edge 40. The purpose and geometry of the relief surfaces 56 are known in the art and are not part of the present invention. In accordance with some embodiments of the subject matter of the present application each relief face surface 36a, 36b can include a relief abutment surface 58, for abutting a corresponding surface on insert holder 24. The relief abutment surface 58 can be spaced apart from the relief surface 56. Each relief face surface 36a, 36b can include a relief bearing surface 60, for being supported by a corresponding surface on insert holder 24. The relief abutment surface 58 can be spaced apart from the relief surface 56 at least by the relief bearing surface 60. Each relief face surface 36a, 36b can include a relief declining surface 62 that can extend between two insert face surfaces 32 that are adjacent to the relief face surface 36a, 36b. That is to say, the relief declining surface 62 can extend between two secondary insert edges 42. The relief declining surface 62 can be spaced apart from the primary insert edge 40, The relief declining surface 62 can decrease in height in a direction away from the primary insert edge 40. That is to say, the relief declining surface 62 can extend inwardly towards a central portion of the cutting insert 22 as it extends in a direction away from the primary insert edge 40. The relief declining surface 62 can divide the relief face surface 36a, 36b into a relief raised portion 64 and a relief lowered portion 66. The relief abutment surface 58 can be located on the relief lowered portion 66. The relief surface 56 can be located on the relief raised portion 64. The relief bearing surface 60 can be located on the relief declining surface 62. The relief bearing surface 60 can be planar. The relief bearing surface 60 can extend longitudinally in a direction parallel to the primary insert edge 40. As mentioned above in reference to "insert edges", the intersection of the relief surface 56 and the adjacent insert face surfaces 32 can be convexly curved.

The cutting insert 22 includes two major cutting edges, a first major cutting edge 44a and a second major cutting edge 44b, for metal cutting operations. Each major cutting edge 44a, 44b is formed at a respective one of the primary insert edges 40. Specifically, the first major cutting edge 44a is formed at the intersection of, and is associated with, the first rake and relief face surfaces 34a, 36a and the second major cutting edge 44b is formed at the intersection of, and is associated with, the second rake and relief face surfaces 34b, 36b. Thus, the cutting insert 22 is two-way indexable (i.e., it can be oriented into only two cutting positions). Also, since there are only a total of two major cutting edges 44a, 44b, each of the four insert surfaces 32 has only one rake face surface 34a, 34b or one relief ace surface 36a, 36b.

Figure 6:
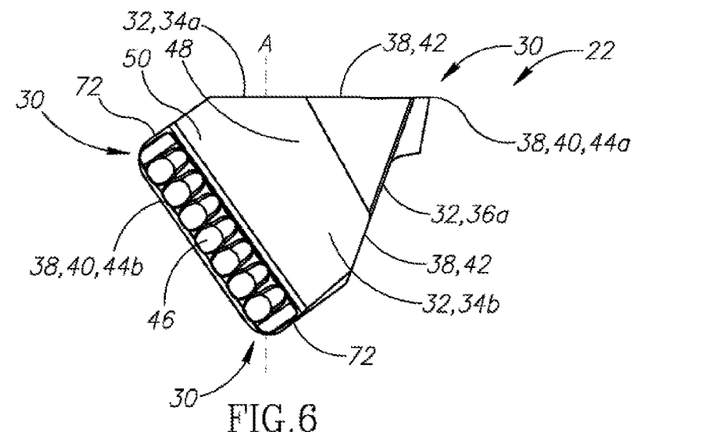
FIG. 6 is a second side view of the cutting insert shown in FIG. 3.

For the sake of clarity, it is noted that the maximum cutting insert width W is measured in a direction along first major cutting edge 44a. As shown in FIGS. 4 and 6, in accordance with some embodiments of the subject matter of the present application each major cutting edge 44a, 44b can extend along the entire length of the primary insert edge 40. Each major cutting edge 44a, 44b can include two convexly curved major cutting edge components 68 formed at two insert corner portions 30 and a straight major cutting edge component 70 that extends therebetween. The straight major cutting edge components 70 on the two major cutting edges 44a, 44b can be oriented at 90° to each other.

In accordance with some embodiments of the subject matter of the present application, the four secondary insert edges 42 can include four minor cutting edges 72. Each minor cutting edge 72 can merge with an associated major cutting edge 44a, 44b at a respective insert corner portion 30. It is noted that in such a configuration, one of the secondary insert edges 42 includes two minor cutting edges 72, two of the secondary insert edges 42 include one minor cutting edge 72 each, and the remaining one of the secondary insert edges 42 is devoid of a minor cutting edge 72. Each minor cutting edge 72 can be straight. Each minor cutting edge 72 can be perpendicular to the straight major cutting edge component 70 of the associated major cutting edge 44a, 44b with which it merges.

Figure 10:
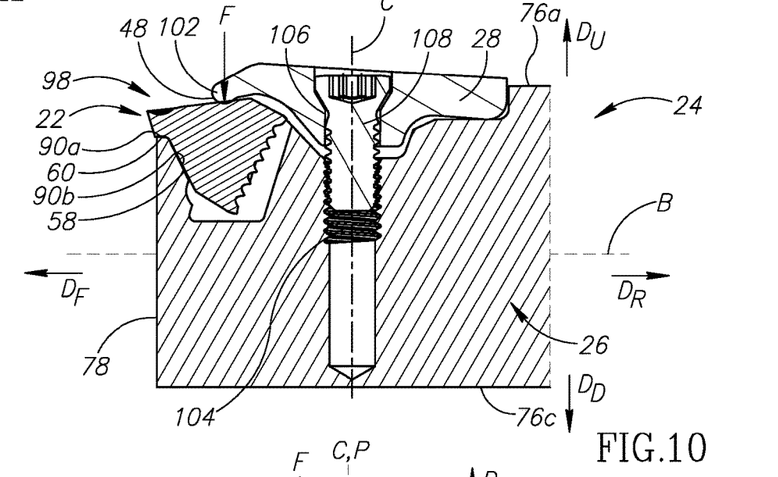
FIG. 10 is a cross section view taken along line X-X shown in FIG. 9.
Figure 11:
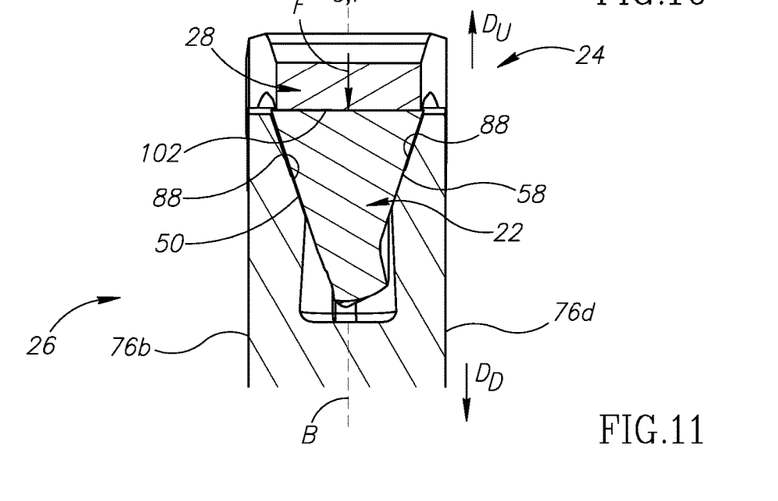
FIG. 11 is a cross section view taken along line XI-XI shown in FIG. 9.

Attention is drawn back to FIGS. 1 and 2 showing an insert holder 24 in accordance with the present application. The insert holder 24 has a holder longitudinal axis B that defines a forward to rearward direction $D_F$, $D_R$ and a holder main plane P that contains the holder longitudinal axis B and passes through both the insert receiving pocket 96 and the holder end surface 78. The insert holder 24 includes an insert holder body 26. The insert holder body 26 includes a holder peripheral surface 76 that extends circumferentially along the holder longitudinal axis B. The holder peripheral surface 76 intersects, and forms a boundary of, a holder end surface 78 at a forward end of the insert holder body 26. The holder longitudinal axis B can intersect the holder end surface 78. It should be appreciated that use of the terms "forward" and "rearward" throughout the description and claims refer to a relative position in a direction of the holder longitudinal axis B towards the left and right, respectively, in FIGS. 7-10. It also should be appreciated that use of the terms "upward" and "downward" throughout the description and claims refer to a relative position in a direction perpendicular to the holder longitudinal axis B upwardly and downwardly, respectively, in FIGS. 8,10 and 11.

Making particular reference to FIG. 2, the holder peripheral surface 76 can include a plurality, for example four, holder peripheral sub-surfaces 76a, 76b, 76c, 76d. However it will be understood that the holder peripheral surface 76 could instead be cylindrical, in which case there would only be one continuous surface.

Figure 7:
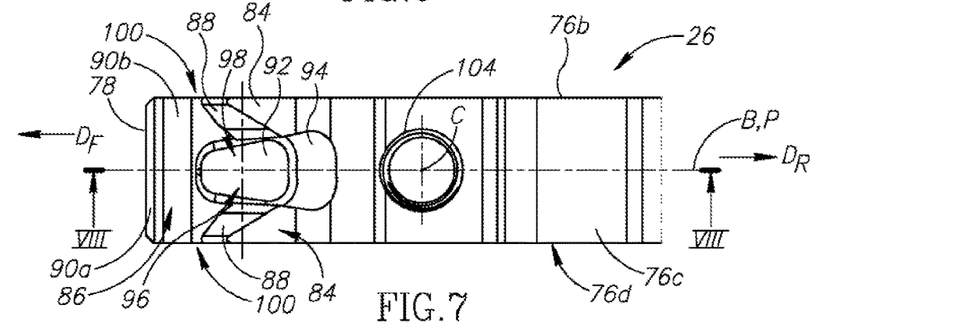
FIG. 7 is a top view of an insert receiving pocket shown in FIG. 2.
Figure 8:
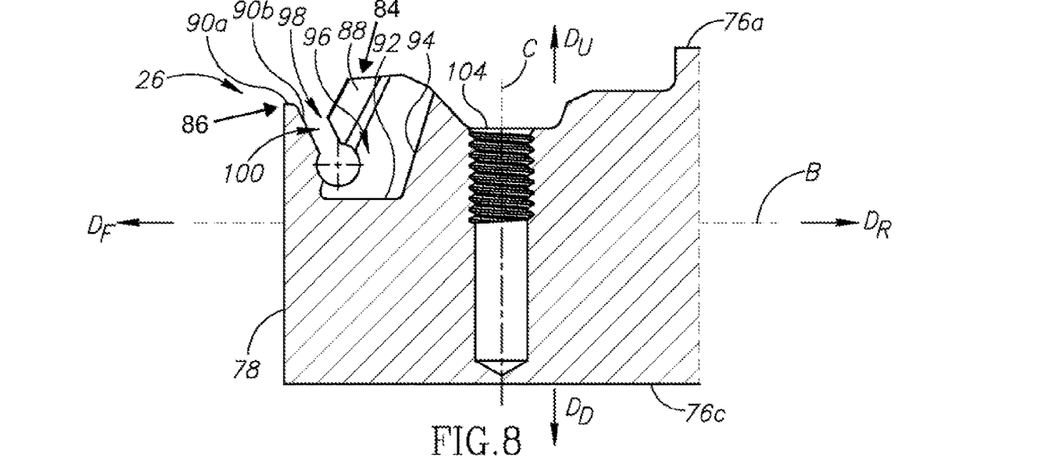
FIG. 8 is a cross section view taken along line VIII-VIII shown in FIG. 7.

Referring now to FIGS. 6 to 8, the insert holder body 26 includes a forwardly located mounting portion 80. That is to say, the mounting portion 80 is located at the forward end of the insert holder body 26. The mounting portion 80 includes three spaced apart mounting jaws 82. In accordance with some embodiments of the subject matter of the present application, the mounting portion 80 can include exactly three mounting jaws 82. The mounting jaws 82 can include two rearward wedge jaws 84 located either side of the holder main plane P and a forward support jaw 86, located forward of the two rearward wedge jaws 84, and intersected by the holder main plane P.

The gap between the mounting jaws 82 forms an insert receiving pocket 96, for releasably retaining the cutting insert 22 therein. The insert receiving pocket 96 has a pocket opening 98 located at the open end of the mounting jaws 82. That is to say, the pocket opening 98 is located at the extremities of the mounting jaws 82. The pocket opening 98 can open out to the holder peripheral surface 76 and the holder end surface 78. The pocket opening 98 is dimensioned as to allow the insertion of the cutting insert 22 into the insert receiving pocket 96. In accordance with some embodiments of the subject matter of the present application, the insert receiving pocket 96 can be recessed in the holder peripheral surface 76 and can open out to the holder end surface 78. The mounting portion 80 can include two jaw slits 100. Each jaw slit 100 separates the forward support jaw 86 from a respective rearward wedge jaw 84 and opens out to the pocket opening 98 at a forward portion of the mounting portion 80. The mounting portion 80 can be mirror symmetrical about the holder main plane P. The insert receiving pocket 96 can be devoid of a pocket threaded hole for retaining the cutting insert.

Each rearward wedge jaw 84 can include a wedge abutment surface 88, for abutting a corresponding surface on the cutting insert 22. The two wedge abutment surfaces 88 can be planar. The two wedge abutment surfaces 88 can generally face each other. Specifically, the two wedge abutment surfaces 88 can slope downwardly simultaneously in the forward direction $D_F$ and in an inward direction towards the holder main plane P. Thus, in a cross sectional plane perpendicular to the holder longitudinal axis B and passing through the two wedge abutment surfaces 88, said two wedge abutment surfaces 88 converge towards each other in the downward direction $D_D$ (see FIG. 11), and in another cross sectional plane parallel to the holder longitudinal axis B and passing through the two wedge abutment surfaces 88, said two wedge abutment surfaces 88 converge towards each other in the rearward direction $D_R$. Thus, the two wedge abutment surfaces 88 have a wedge configuration that provides a good coupling, with good resistance against lateral cutting forces, when performing groove-turning cutting operations in either lateral direction. The forward support jaw 86 can include a primary support abutment surface 90a, for abutting a corresponding surface on the cutting insert 22. The primary support abutment surface 90a can face generally in the upward direction $D_U$. The primary support abutment surface 90a can be planar. The primary support abutment surface 90a can extend longitudinally in a direction perpendicular to the holder longitudinal axis B. The primary support abutment surface 90a can extend longitudinally across the entire width of the insert holder body 26. The forward support jaw 86 can include a secondary support abutment surface 90b, for abutting a corresponding surface on the cutting insert 22, that is located rearward of, and extends transversely to, the primary support abutment surface 90a. The secondary support abutment surface 90b can face generally in the rearward direction $D_R$. The secondary support abutment surface 90b can be planar. Like the primary support abutment surface 90a, the secondary support abutment surface 90b can extend longitudinally in a direction perpendicular to the holder longitudinal axis B and across the entire width of the insert holder body 26.

The mounting portion 80 can include a jaw base surface 92 and a jaw rear surface 94 that extends transversely to jaw base surface 92, and forms a rearward boundary of the mounting portion 80. The jaw base surface 92 can be parallel to the holder longitudinal axis B. The forward support jaw 86 can project from the jaw base surface 92. The jaw rear surface 94 can slope upwardly in the rearward direction $D_R$. The two rearward wedge jaws 84 can be connected by, and project from, the jaw rear surface 94.

Figure 9:
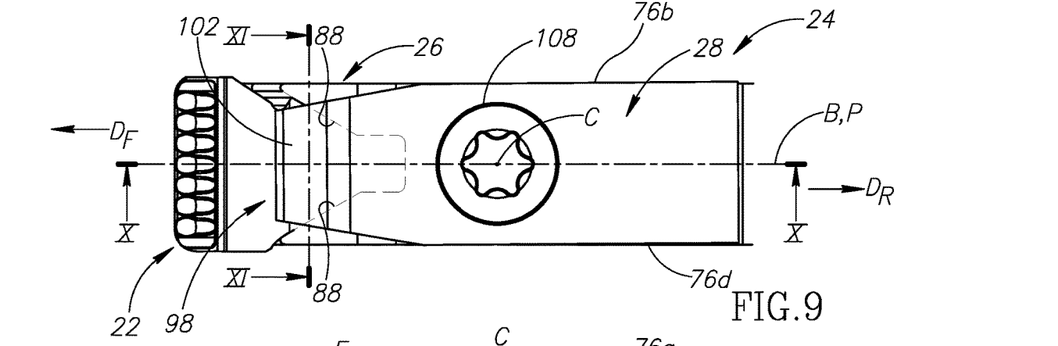
FIG. 9 is a top view of the insert receiving pocket when the cutting tool is in the fastened position.

Reference is now made to FIG. 9 showing a top view of the insert receiving pocket 96 (i.e. viewed in the downward direction $D_U$) when the cutting tool 20 is in the fastened position. The dashed line indicates the rear portion of insert receiving pocket 96. The insert holder 24 includes the clamping member 28 that is attachable to the insert holder body 26. The clamping member 28 includes a clamping portion 102 that protrudes into the pocket opening 98. Stated differently, as seen in FIG. 9, in a top view of the insert receiving pocket 96 (i.e. viewed in the downward direction $D_U$) when the cutting tool 20 is in the fastened position, the clamping portion 102 overhangs the insert receiving pocket 96 in the forward direction $D_F$. Thus, a portion of the pocket opening 98 is hidden by the clamping portion 102. Specifically, as seen the same view, the clamping portion 102 is located between, and preferably axially forward of, the wedge abutment surfaces 88. In accordance with some embodiments of the subject matter of the present application the clamping member 28 can be elongated. The clamping portion 102 can be located at an extremity of the clamping member 28. The clamping member 28 can be separately formed from the insert holder body 26. In particular, the clamping member 28 can include a clamping member through hole 106. The clamping member through hole 106 can be located at a mid-portion of the clamping member 28. The insert holder body 26 can include a holder threaded bore 104 that can be is recessed in, and open out to, the holder peripheral surface 76 rearward of the insert receiving pocket 96. The holder threaded bore 104 extends a long a threaded bore axis C that can be contained in the holder main plane P. The clamping member 28 can be releasably attached to the insert holder body 26 by a retaining screw 108 located in the clamping member through hole 106 and threadingly received in the holder threaded bore 104.

The seating and support of the cutting insert 22 in the insert receiving pocket 96 will be described with reference to FIGS. 1, 9-11. In the fastened position of the cutting tool 20, the cutting insert 22 is releasably attached to the insert holder body 26. The cutting insert 22 is located in the insert receiving pocket 96 and clampingly engaged therein by the clamping portion 102 of the clamping member 28. In accordance with some embodiments of the subject matter of the present application, the primary support abutment surface 90a can abut the relief bearing surface 60 of the first relief face surface 36a. Preferably, the secondary support abutment surface 90b can abut a portion of the relief abutment surface 58 of the first relief face surface 36a. One of the wedge abutment surfaces 88 can abut the rake abutment surface 50 of the second rake face surface 34b. The other one of the wedge abutment surfaces 88 can abut the relief abutment surface 58 of the second relief face surface 36b. The clamping portion 102 of the clamping member 28 can clampingly engage the rake clamping surface 48 of the first rake face surface 34a, thus applying a clamping force F in the downward direction $D_D$ upon the rake clamping surface 48. Such a seating provides a secure mounting for the cutting insert 22.

Figure 12:
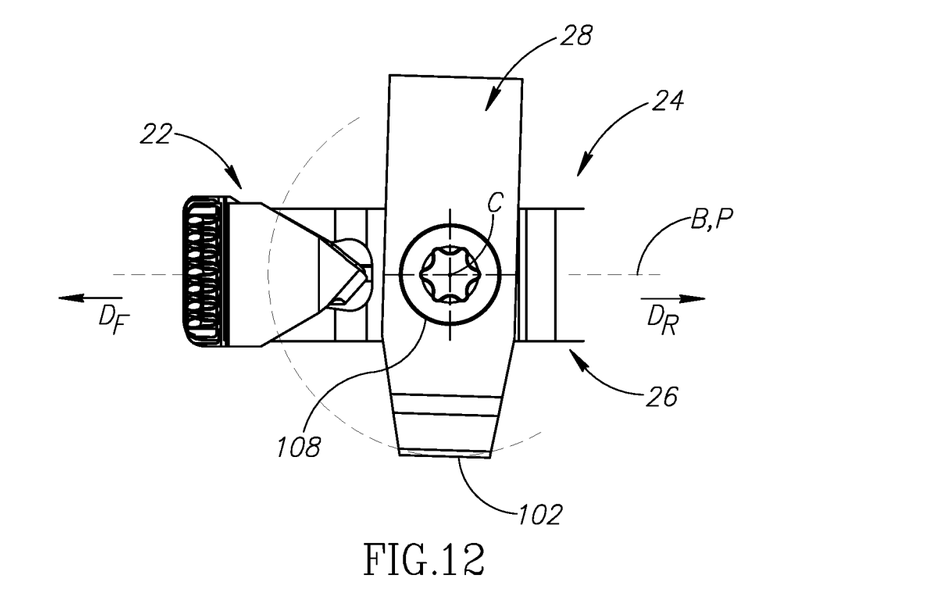
FIG. 12 is a top view of the insert receiving pocket when the cutting tool is in the released position.

Reference is now made to FIG. 12 showing a top view of the insert receiving pocket 96 when the cutting tool 20 is in the released position. The dashed line indicates arc swept out by the clamping member 28 as it rotates about the threaded bore axis C. When the cutting insert 22 is to be removed from the insert holder 24, for example when the operative cutting edge 44a, 44b is worn out, and the cutting insert 22 is to be replaced or indexed, the cutting tool 20 is adjusted from the fastened position to the released position. In accordance with some embodiments of the subject matter of the present application, the retaining screw 26 is partially unthreaded from the holder threaded bore 104. That is, the retaining screw 26 is partially threadingly received in the holder threaded bore 104. As seen in FIG. 12, in such a configuration, the clamping member 28 can be rotated about the threaded bore axis C of the holder threaded bore 104 so that the clamping portion 102 does not obstruct the pocket opening 98. In this released position of the cutting tool 20, with the pocket opening 98 unobstructed, the cutting insert 22 can be indexed, or removed and a new cutting insert placed into the insert receiving pocket.

Although the subject matter of the present application has been described to a certain degree of particularity, it should be understood that various alterations and modifications could be made without departing from the spirit or scope of the invention as hereinafter claimed.

What is claimed is:

1. A two-way indexable cutting insert (22) comprising:
   a regular tetrahedral basic shape defined by exactly four insert corner portions (30); and four insert face surfaces (32) mutually intersecting each other and comprising:
   a first rake face surface (34a) and a first relief face surface (36a) that intersect to form a first major cutting edge (44a); and
   a second rake face surface (34b) and a second relief face surface (36b) that intersect to form a second major cutting edge (44b) wherein:
   each of the four insert face surfaces (32) has only one rake face surface (34a, 34b) or one relief face surface (36a, 36b), and none of the insert face surfaces has both a rake face surface (34a, 34b) and also a relief face surface (36a, 36b).

2. The cutting insert (22), according to claim 1, wherein:
the first and second rake face surfaces (34a, 34b) are identical to each other; and
the first and second relief face surfaces (36a, 36b) are identical to each other.

3. The cutting insert (22), according to claim 1, wherein:
the first and second relief face surfaces (36a, 36b) are non-identical to the first and second rake face surfaces (34a, 34b).

4. The cutting insert (22), according to claim 1, wherein each insert face surface (32) has a generally triangular shape defined by three insert corner portions (30).

5. The cutting insert (22), according to claim 1, wherein:
the first and second rake face surfaces (34a, 34b) and first and second relief face surfaces (36a, 36b) all mutually intersect each other to form exactly six insert edges (38), each insert edge (38) extending between two insert corner portions (30); wherein
the exactly six insert edges (38) comprise two spaced apart primary insert edges (40) formed at the intersection of the first rake and relief face surfaces (34a, 36a) and the second rake and relief face surfaces (34b, 36b) respectively and four secondary insert edges (42) connecting the two primary insert edges (40); and
each major cutting edge (44a, 44b) is formed at a respective one of the primary insert edges (40).

6. The cutting insert (22), according to claim 5, wherein each major cutting edge (44a, 44b) extends along the entire length of the primary insert edge (40).

7. The cutting insert (22), according to claim 5, wherein:
the four secondary insert edges (42) comprise four minor cutting edges (72); and
each minor cutting edge (72) merges with an associated major cutting edge (44a, 44b) at a respective insert corner portion (30).

8. The cutting insert (22), according to claim 7, wherein each minor cutting edge (72) is straight.

9. The cutting insert (22), according to claim 8, wherein:
each major cutting edge (44a, 44b) comprises two convexly curved major cutting edge components (68) and a straight major cutting edge component (70) extending therebetween; and
each minor cutting edge (72) is perpendicular to the straight major cutting edge component (70) of the associated major cutting edge (44a, 44b) with which it merges.

10. The cutting insert (22), according to claim 1, wherein:
each rake face surface (34a, 34b) comprises a rake surface (46) adjacent each major cutting edge (44a, 44b);
each rake face surface (34a, 34b) further comprises a rake clamping surface (48); and the rake clamping surface (48) is spaced apart from the rake surface (46).

11. The cutting insert (22), according to claim 10, wherein the rake clamping surface (48) is spaced apart from the rake surface (46) at least by a rake abutment surface (50).

12. The cutting insert (22), according to claim 1, wherein:
each relief face surface (36a, 36b) comprises a relief surface (56) adjacent each major cutting edge (44a, 44b);
each relief face surface (36a, 36b) comprises a relief abutment surface (58); and
the relief abutment surface (58) is spaced apart from the relief surface (56).

13. The cutting insert (22), according to claim 12, wherein the relief abutment surface (58) is spaced apart from the relief surface (56) at least by a relief bearing surface (60).

14. The cutting insert (22), according to claim 13, wherein:
each relief face surface (36a, 36b) comprises a relief declining surface (62) extending between two adjacent insert face surfaces (32), the relief declining surface (62) being spaced apart from, and decreasing in height in a direction away from, the major cutting edge (44a, 44b), the relief declining surface (62) dividing the relief face surface (36a, 36b) into a relief raised portion (64) and a relief lowered portion (66);
the relief abutment surface (58) is located on the relief lowered portion (66);
the relief surface (56) is located on the relief raised portion (64); and
the relief bearing surface (60) is located on the relief declining surface (62).

15. The cutting insert (22), according to claim 1, wherein each major cutting edge (44a, 44b) comprises two convexly curved major cutting edge components (68) formed at two insert corner portions (30) and a straight major cutting edge component (70) extending therebetween.

16. The cutting insert (22), according to claim 15, wherein the straight major cutting edge components (70) on the two major cutting edges (44a, 44b) are oriented at 90° to each other.

17. The cutting insert (22), according to claim 1, wherein the cutting insert (22) is devoid of a through-hole.

18. An insert holder (24) having a holder longitudinal axis (B) defining a forward to rearward direction (DF, DR), and comprising:
an insert holder body (26) comprising:
a holder peripheral surface (76) extending circumferentially along the holder longitudinal axis (B), the holder peripheral surface (76) intersecting and forming a boundary of, a holder end surface (78) at a forward end of the insert holder body (26); and
a forwardly located mounting portion (80) comprising three spaced apart mounting jaws (82) together defining an insert receiving pocket (96) that has a pocket opening (98) located at extremities of the mounting jaws (82); and
a clamping member (28) attached to the insert holder body (26), the clamping member (28) comprising a clamping portion (102) protruding into the pocket opening (98), wherein:
the insert holder (24) has a holder main plane (P) that contains the holder longitudinal axis (B) and passes through both the insert receiving pocket (96) and the holder end surface (78); and
the mounting jaws (82) comprise:
two rearward wedge jaws (84) located either side of the holder main plane (P); and
a forward support jaw (86), located forward of the two rearward wedge jaws (84), and intersected by the holder main plane (P).

19. The insert holder (24), according to claim 18, wherein:
the clamping member (28) is elongated; and
the clamping portion (102) is located at an extremity of the clamping member (28).

20. The insert holder (24), according to claim 18, wherein the insert receiving pocket (96) is recessed in the holder peripheral surface (76) and opens out to the holder end surface (78).

21. The insert holder (24), according to claim 18, wherein the mounting portion (80) comprises exactly three mounting jaws (82).

22. The insert holder (24), according to claim 18, wherein
the mounting portion (80) comprises a jaw base surface (92) and a jaw rear surface (94) extending transversely thereto, and forming a rearward boundary of the mounting portion (80);
the two rearward wedge jaws (84) are connected by, and project from, the jaw rear surface (94); and
the forward support jaw (86) projects from the jaw base surface (92).

23. The insert holder (24), according to claim 18, wherein the mounting portion (80) comprises two jaw slits (100), each jaw slit (100) separating the forward support jaw (86) from a respective rearward wedge jaw (84) and opening out to the pocket opening (98) at a forward portion of the mounting portion (80).

24. The insert holder (24), according to claim 18, wherein the mounting portion (80) is mirror symmetrical about the holder main plane (P).

25. The insert holder (24), according to claim 18, wherein
each rearward wedge jaw (84) comprises a wedge abutment surface (88); and
the forward support jaw (86) comprises a primary support abutment surface (90a).

26. The insert holder (24), according to claim 25, wherein the two wedge abutment surfaces (88) slope downwardly simultaneously in the forward direction (DF) and in an inward direction towards the holder main plane (P).

27. The insert holder (24), according to claim 25, wherein the primary support abutment surface (90a) extends longitudinally in a direction perpendicular to the holder longitudinal axis (B).

28. The insert holder (24), according to claim 25, wherein the primary support abutment surface (90a) extends longitudinally across the entire width of the insert holder body (26).

29. The insert holder (24), according to claim 25, wherein the two wedge abutment surfaces (88) and the primary support abutment surface (90a) are planar.

30. The insert holder (24), according to claim 18, wherein the insert receiving pocket (96) is devoid of a pocket threaded hole for retaining a cutting insert.

31. The insert holder (24), according to claim 18, wherein the clamping member (28) is separately formed from the insert holder body (26).

32. The insert holder (24), according to claim 31, wherein:
the insert holder body (26) comprises a holder threaded bore (104) being recessed in, and opening out to, the holder peripheral surface (76) rearward of the insert receiving pocket (96);
the clamping member (28) comprises a clamping member through hole (106); and
the clamping member (28) is releasably attached to the insert holder body (26) by a retaining screw (108) located in the clamping member through bore (106) and threadingly received in the holder threaded bore (104).

33. The insert holder (24), according to claim 32, wherein when the retaining screw (108) is partially threadingly received in the holder threaded bore (104), the clamping member (28) is rotatable about a threaded bore axis (C) of the holder threaded bore (104) so that the clamping portion (102) does not obstruct the pocket opening (98).

34. A cutting tool (20) adjustable between a released position and fastened position, and comprising:
an insert holder (24) in accordance with claim 18; and
a two-way indexable cutting insert (22) located in the insert receiving pocket (96) and clamped therein by the insert holder's clamping portion (102), in the fastened position, wherein:
the cutting insert (22) has a tetrahedral basic shape defined by exactly four insert corner portions (30) and comprises:
four insert face surfaces (32) mutually intersecting each other and comprising:
a first rake face surface (34a) and a first relief face surface (36a) that intersect to form a first major cutting edge (44a); and
a second rake face surface (34b) and a second relief face surface (36b) that intersect to form a second major cutting edge (44b).

35. The cutting tool (20), according to claim 34, wherein:
the insert holder (24) has a holder main plane (P) that contains the holder longitudinal axis (B) and passes through both the insert receiving pocket (96) and the holder end surface (78);
the mounting jaws (82) comprise:
two rearward wedge jaws (84) located either side of the holder main plane (P), each rearward wedge jaw (84) comprising a wedge abutment surface (88);
a forward support jaw (86), located forward of the two rearward wedge jaws (84), and intersected by the holder main plane (P), the forward support jaw (86) comprising a primary support abutment surface (90a); and
in the cutting insert:
each rake face surface (34a, 34b) comprises a rake surface (46) adjacent each major cutting edge (44a, 44b);
each rake face surface (34a, 34b) further comprises a rake clamping surface (48); and the rake clamping surface (48) is spaced apart from the rake surface (46) at least by a rake abutment surface (50);
each relief face surface (36a, 36b) comprises a relief surface (56) adjacent each major cutting edge (44a, 44b);
each relief face surface (36a, 36b) comprises a relief abutment surface (58);
the relief abutment surface (58) is spaced apart from the relief surface (56);
the relief abutment surface (58) is spaced apart from the relief surface (56) at least by a relief bearing surface (60); and
in the fastened position of the cutting tool (20):
the clamping portion (102) clampingly engages the rake clamping surface (48) of the first rake face surface (34a);
the primary support abutment surface (90a) abuts the relief bearing surface (60) of the first relief face surface (36a);
one of the wedge abutment surfaces (88) abuts the rake abutment surface (50) of the second rake face surface (34b); and
the other one of the wedge abutment surfaces (88) abuts the relief abutment surface (58) of the second relief face surface (36b).

36. The cutting tool (20), according to claim 35, wherein:
each relief face surface (36a, 36b) comprises a relief declining surface (62) extending between two adjacent insert face surfaces (32), the relief declining surface (62) being spaced apart, and decreasing in height in a direction away, from the major cutting edge (44a, 44b), the relief declining surface (62) dividing the relief face surface (36a, 36b) into a relief raised portion (64) and a relief lowered portion (66);

the relief abutment surface (58) is located on the relief lowered portion (66);

the relief surface (56) is located on the relief raised portion (64); and the relief bearing surface (60) is located on the relief declining surface (62).

37. The cutting tool (20), according to claim 35, wherein:

the forward support jaw (86) comprises a secondary support abutment surface (90b) that is located rearward of, and extends transversely to, the primary support abutment surface (90a); and in the fastened position of the cutting tool (20):

the secondary support abutment surface (90b) abuts a portion of the relief abutment surface (58) of the first relief face surface (36a).

38. The cutting tool (20), according to claim 34, wherein the cutting insert (22) has a regular tetrahedral basic shape.

39. A cutting tool (20) adjustable between a released position and fastened position, and comprising:

a cutting insert (22) in accordance with claim 1 releasably retained in an insert holder (24).

40. The cutting tool (20) according to claim 39, wherein:

the insert holder (24) has a holder longitudinal axis (B) defining a forward to rearward direction (DF, DR), and comprises:

an insert holder body (26) comprising:

a holder peripheral surface (76) extending circumferentially along the holder longitudinal axis (B), the holder peripheral surface (76) intersecting and forming a boundary of, a holder end surface (78) at a forward end of the insert holder body (26); and a forwardly located mounting portion (80) comprising three spaced apart mounting jaws (82) together defining an insert receiving pocket (96) that has a pocket opening (98) located at extremities of the mounting jaws (82); and a clamping member (28) attached to the insert holder body (26), the clamping member (28) comprising a clamping portion (102) protruding into the pocket opening (98); and the cutting insert (22) is located in the insert receiving pocket (96) and clamped therein by the insert holder's clamping portion (102), in the fastened position.

* * * * *